US008787251B2

(12) United States Patent
Littlefield et al.

(10) Patent No.: US 8,787,251 B2
(45) Date of Patent: Jul. 22, 2014

(54) METHOD AND APPARATUS FOR PROVISIONING OF INFORMATION IN A CELLULAR COMMUNICATION NETWORK

(75) Inventors: Joshua B. Littlefield, Wellesley, MA (US); Anton Okmyanskiy, Vancouver (CA); Archie Hensley, Lawrenceville, GA (US); Edward Haynes, Suwanee, GA (US); Ian McPherson, Huntingdon (GB); David Neil, Cambridge (GB); Alan Whitehead, Cambridge (GB)

(73) Assignees: Cisco Technology, Inc., San Jose, CA (US); IP.Access Limited, Cambridge, Cambridgeshire (GB)

(*) Notice: Subject to any disclaimer, the term of this patent is extended or adjusted under 35 U.S.C. 154(b) by 933 days.

(21) Appl. No.: 12/487,717

(22) Filed: Jun. 19, 2009

(65) Prior Publication Data

US 2009/0318193 A1  Dec. 24, 2009

Related U.S. Application Data

(60) Provisional application No. 61/074,797, filed on Jun. 23, 2008, provisional application No. 61/164,133, filed on Mar. 27, 2009.

(30) Foreign Application Priority Data

Jun. 25, 2008 (GB) .................................... 0811707.9

(51) Int. Cl.
*H04W 4/00* (2009.01)
*H04W 24/00* (2009.01)
(52) U.S. Cl.
USPC ........................................ 370/328; 455/456.2
(58) Field of Classification Search
None
See application file for complete search history.

(56) References Cited

U.S. PATENT DOCUMENTS

| 7,600,003 | B1 | 10/2009 | Okmianski et al. |
| 7,764,185 | B1* | 7/2010 | Manz et al. ................... 340/601 |
| 2005/0148368 | A1 | 7/2005 | Scheinert et al. |
| 2006/0114839 | A1 | 6/2006 | Meier et al. |
| 2007/0097939 | A1 | 5/2007 | Nylander et al. |
| 2007/0234156 | A1* | 10/2007 | Bancel et al. .................. 714/728 |
| 2007/0254620 | A1* | 11/2007 | Lindqvist et al. ............. 455/403 |
| 2009/0239508 | A1* | 9/2009 | Waddell ...................... 455/414.1 |
| 2009/0253421 | A1* | 10/2009 | Camp et al. ................... 455/418 |
| 2011/0263274 | A1* | 10/2011 | Fox et al. .................... 455/456.2 |

FOREIGN PATENT DOCUMENTS

WO     0217665   A1     2/2002

OTHER PUBLICATIONS

United Kingdom Search Report dated Apr. 29, 2009; cited in UK Patent Application No. GB0811707.9.
Combined Search and Examination Report under Section 17 and 18(3) dated Nov. 11, 2010; cited in application No. GB1013166.2.
PCT International Search Report and Written Opinion in counterpart International Application No. PCT/EP2009/057669, dated Sep. 23, 2009.

* cited by examiner

*Primary Examiner* — Afshawn Towfighi
(74) *Attorney, Agent, or Firm* — Edell, Shapiro & Finnan, LLC

(57) ABSTRACT

A network management system for managing communications in a cellular communication network comprising an access point operably coupled to an access controller. The network management system comprises an access controller configuration logic module arranged to configure the access controller with configuration information. The network management system further comprises an access point configuration logic module arranged to configure the access point with configuration information comprising, at least in part, configuration information intended for the access controller.

24 Claims, 7 Drawing Sheets

METHOD AND APPARATUS FOR PROVISIONING OF INFORMATION IN A CELLULAR COMMUNICATION NETWORK

CROSS REFERENCE TO RELATED APPLICATIONS

This application claims priority to U.S. Provisional Patent Application No. 61/074,797, filed Jun. 23, 2008, and to United Kingdom Provisional Patent Application No. 0811707.9, filed Jun. 25, 2008 and to U.S. Provisional Patent Application No. 61/164,133, filed Mar. 27, 2009. The entirety of each of the aforementioned applications is incorporated herein by reference.

FIELD OF THE INVENTION

The field of the invention relates to a method and apparatus for provisioning of information in a cellular communication network, and more particularly to a method and apparatus for provisioning of information in a femto cell communication network.

BACKGROUND

Wireless communication systems, such as the $3^{rd}$ Generation (3G) of mobile telephone standards and technology, are well known. An example of such 3G standards and technology is the Universal Mobile Telecommunications System (UMTS), developed by the $3^{rd}$ Generation Partnership Project (3GPP) (www.3Gpp.org).

Typically, wireless subscriber communication units, or User Equipment (UE) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network.

The $3^{rd}$ generation of wireless communications has been developed for macro-cell mobile phone communications. Such macro cells utilise high power base stations (NodeBs in 3GPP parlance) to communicate with UEs within a relatively large coverage area.

Lower power (and therefore smaller coverage area) femto cells or pico-cells are a recent development within the field of wireless cellular communication systems. Femto cells or pico-cells (with the term femto cells being used hereafter to encompass pico-cells or similar) are effectively communication coverage areas supported by low power base stations (otherwise referred to as Access Points (APs)). These femto cells are intended to be able to be piggy-backed onto the more widely used macro-cellular network and support communications to UEs in a restricted, for example 'in-building', environment.

In this regard, a femto cell that is intended to support communications according to the 3GPP standard will hereinafter be referred to as a 3G femto cell. Similarly, an access controller intended to support communications with a low power base station in a femto cell according to the 3GPP standard will hereinafter be referred to as a $3^{rd}$ generation access controller (3G AC). Similarly, an Access Point intended to support communications in a femto cell according to the 3GPP standard will hereinafter be referred to as a $3^{rd}$ Generation Access Point (3G AP).

In a 3G femto cell deployment, each 3G AC is arranged to support a large set of 3G APs. Each 3G AP is configured to associate with a specific 3G AC, and each 3G AC must be specifically provisioned to authorize and service each 3G AP. Typical applications for such 3G femto cell APs include, by way of example, residential and commercial (e.g. office) locations, 'hotspots', etc, whereby an AP can be connected to a core network via, for example, the Internet using a broadband connection or the like. In this manner, femto cells can be provided in a simple, scalable deployment in specific in-building locations where, for example, network congestion at the macro-cell level may be problematic.

Typically, each 3G femto cell AP is owned by a member of the public, as opposed to a Network Operator, and the owner of the 3G AP pays for the network resources, such as Digital Subscriber Line (DSL) bandwidth, used through the femto cell.

It is known that a consequence of the introduction of numerous femto cells is a need to provision the 3G AP with various useful parameters that enable it to find suitable information to enable it to transmit and work in harmony with the rest of the macro cellular network. In this regard, the initial provisioning information of the 3G AP should allow the 3G AP to search a provided range/selection of frequencies, primary scrambling codes and transmit powers in order to find values that optimize its integration into, and minimize interference it causes, to the macro-cellular network.

Referring now to FIG. 1A and FIG. 1B, a known proposed architecture 100 for provisioning a 3G AC and a 3G AP in a femto cell network, is illustrated. The architecture 100 comprises a femto cell AP, for example a 3G AP, 105 that is operably coupled to a managed residential gateway, for example a 3G AC, 125 over a local area network (LAN) 120. The managed residential gateway 125 is operably coupled to an auto configuration server (ACS) 135 via a regional broadband network 130. The ACS 135 is arranged to independently provision, and receive provision parameter confirmation, the managed residential gateway 125 via southbound interface 140. The ACS 135 is arranged to independently provision, and receive provision parameter confirmation, the femto cell AP 125 via southbound interface 110. The ACS 135 is also operably coupled to a service configuration manager 145 via a northbound interface.

Referring now to FIG. 1B, the operation of the known architecture 150 is illustrated in more detail. Here, a Network Operator Management System 155 forwards configuration (provisioning) information to the femto cell management system 135. The femto cell management system 135 is operably coupled to respective logical entities a femto cell gateway (or access controller) management system (FGW-MS) 160 and a femto cell access point management system (FAP-MS) 165. The FGW-MS 160 is arranged to independently configure the femto cell gateway 125 via interface Fg 170. The FAP-MS 166 is arranged to independently configure the femto cell AP 105 via interface Fm 175.

Thus, a need exists for an improved method and apparatus for provision of information in a cellular communication network.

SUMMARY

According to a first aspect of the invention, there is provided a network management system, for example a femto cell management system comprising a logic module arranged to configure an access point, for example a femto 3G access point, with configuration information. The configuration information provided to the access point comprises, in part, further and or the same configuration information intended for an access controller operably coupled to the access point.

In an optional embodiment, the configuration information provided to the access point comprises substantially all the information that may be needed by the access controller. In an optional embodiment, the access point is able to pass the configuration information to the access controller during connection setup, in order to establish its service parameters and provide authorization.

According to a second aspect of the invention, there is provided an access point comprising logic modules for receiving and processing configuration information. The configuration information provided to the access point comprises, in part, further and/or the same configuration information intended for an access controller operably coupled to the access point.

According to a third aspect of the invention, there is provided an access controller comprising logic modules for receiving and processing configuration information provided by an access point from configuration information provided to the access point, where the configuration information comprises, in part, further and/or the same configuration information intended for an access controller operably coupled to the access point.

According to respective fourth, fifth and sixth aspects of the invention, corresponding methods for configuring an access controller in a respective management system, access point and access controller are provided, according to the first, second and third aspects.

According to respective seventh, eighth and ninth aspects of the invention, corresponding integrated circuits comprising associated logic modules for configuring an access controller in a respective management system, access point and access controller are provided, according to the first, second and third aspects.

According to respective tenth, eleventh and twelfth aspects of the invention, corresponding computer-readable storage elements having computer-readable code stored thereon for programming signal processing logic to perform methods for configuring an access controller in a respective management system, access point and access controller are provided, according to the fourth, fifth and sixth aspects.

According to a thirteenth aspect of the invention there is provided a cellular communication network comprising the respective management system, access point and access controller of the first, second and third aspects of the invention.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION

As 3G APs are deployed or relocated in the network, the associated 3G ACs should be updated as to the 3G AP's deployment and operational status. To avoid having to provision both the 3G AP and the 3G AC when a new 3G AP-3G AC association is desired, or when a 3G AP-3G AC association changes, embodiments of the invention propose to configure the 3G AP with substantially all the information that may be needed by the 3G AC, in order that the 3G AP is able to pass this to the 3G AC during connection setup in order to establish its service parameters and authorization. Advantageously, this indirect method of 3G AC provisioning ensures that the 3G AC always has the information needed to service an associated 3G AP.

Figure 1A:
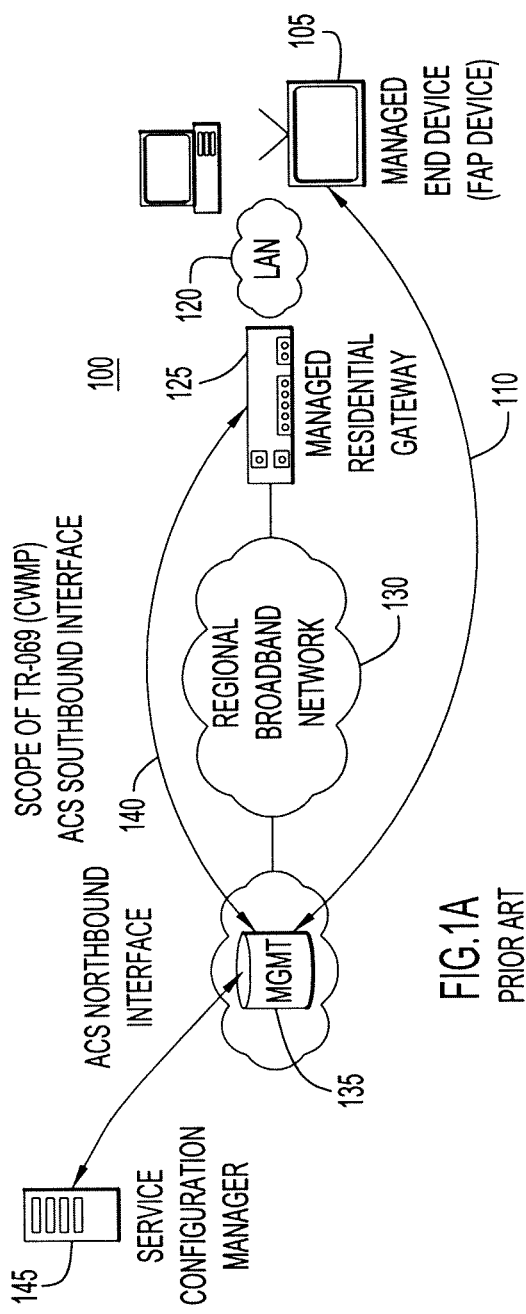
FIG. 1A and FIG. 1B illustrate a known proposed mechanism for provisioning a 3G AC and a 3G AP in a femto cell network.
Figure 1B:
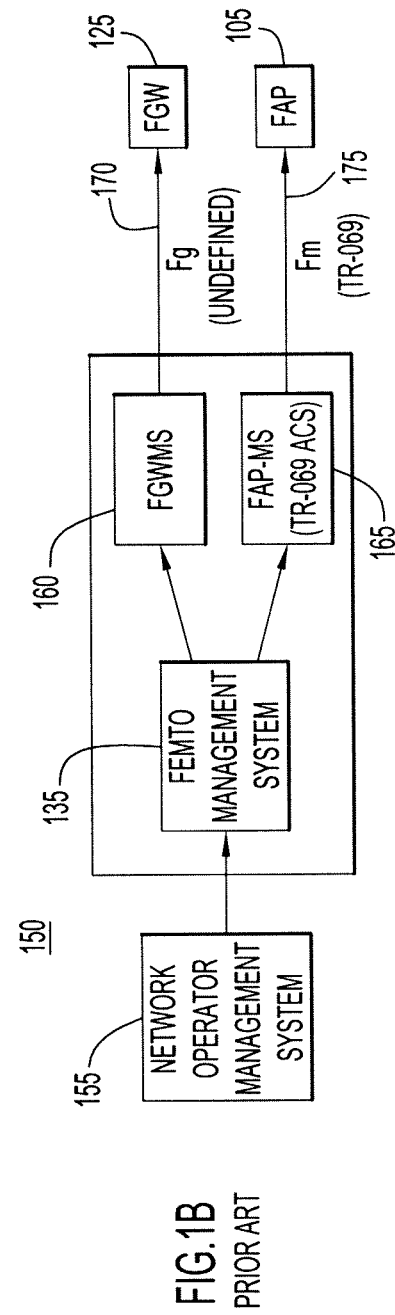
Figure 2:
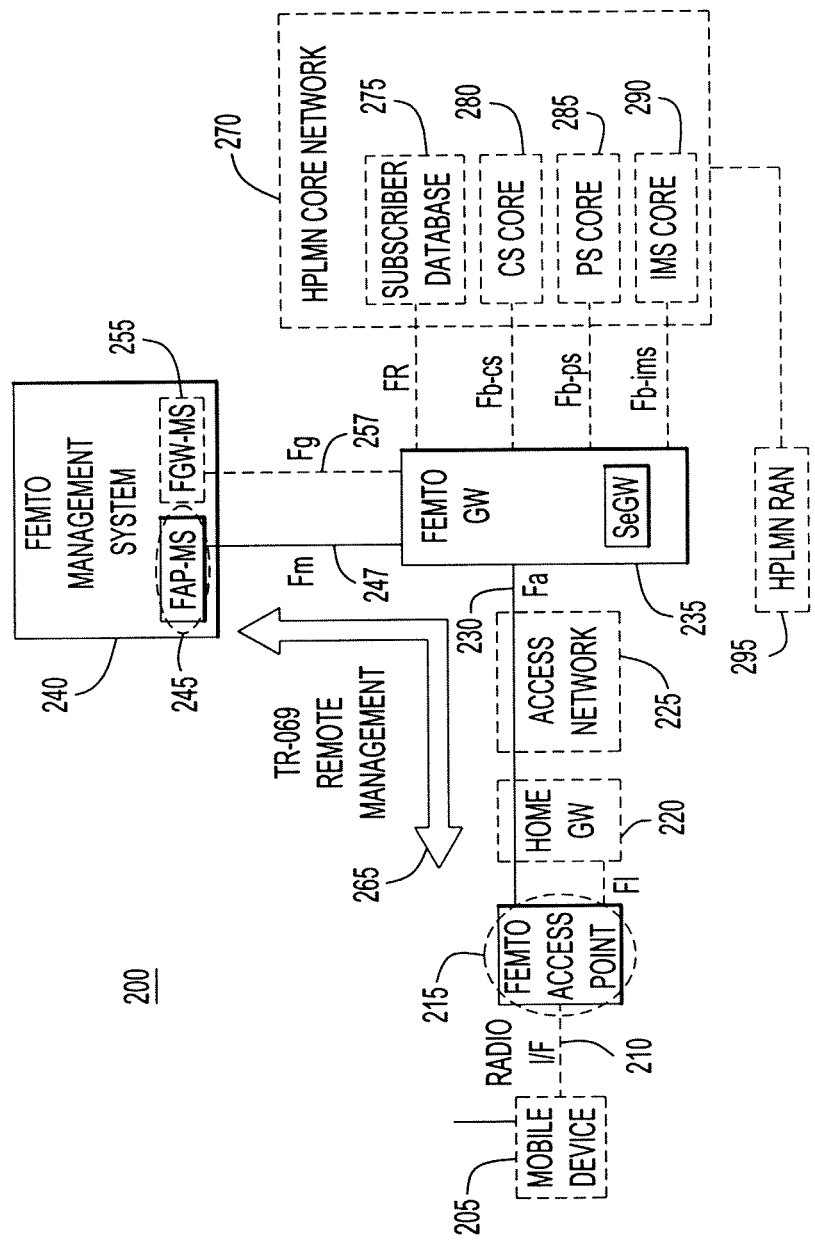
FIG. 2 illustrates an example of part of a cellular communication network architecture adapted in accordance with some embodiments of the invention.

Referring now to FIG. 2, there is illustrated an architecture 200 adapted according to embodiments of the invention that is arranged to provision a 3G AP with substantially all the information that may be needed by an associated 3G AC. The architecture 200 comprises a mobile device 205 that wirelessly communicates with a femto cell 3G AP 215 via a radio interface 210. The femto cell 3G AP 215 may be operably coupled to a home gateway 220 via an interface (F1) and may be operably coupled to a 3G AC 235 via an access network 225 and a further interface (Fa) 230. The 3G AC 235 is operably coupled to a femto cell management system 240 comprising two application logic modules: a femto cell AP management system (FAP-MS) 245 and a femto cell AC management system (FAC-MS) 255. The femto cell management system 240 comprises two provisioning interfaces for the Femtocell Management System:

(i) an Fm Interface 247 that is provided by the femto cell management system 240 using TR-069 remote management protocol linking the FAP-MS logic module 245 to the 3G AP 215; and (ii) an Fg Interface 257 linking the femto cell AC management system (FAC-MS) 255 with the 3G AC 235, which is adapted to no longer include information about 3G APs that may require access to the network via the 3G AC 235.

As known, the 3G AC 235 is operably coupled to a home public land mobile network (HPLMN) core network 270 that comprises inter alia, for example, known subscriber databases 275, a circuit switched core network 280, a packet-switched core network 285 and an Internet protocol Multi-media Sub-system (IMS) 290 via a series of respective interfaces, as shown. The HPLMN core network 270 is shown operably coupled to a HPLMN radio access network 295 as known in the art.

In accordance with embodiments of the invention, the femto management system 240 is arranged to provision FAP information on the 3G AC 235 via the 3G AP 215. The use of one provisioning interface, namely the Fm Interface 247, to support the provisioning of both the 3G AP 215 and the 3G AC 235 reduces the risk of any data misalignment between the 3G AP 215 and the 3G AC 235. In particular, the 3G AP 215 is adapted to act as an Intelligent Residential Gateway. As such, the 3G AP 215 is able to provision the 3G AC 235 with the required information for services in a similar manner to existing DSL Provisioning Architectures.

This results in reduced capital expenditure and operating costs due to a reduced number of Femtocell Management applications and interfaces being required to be defined, developed, integrated, and supported.

In accordance with an embodiment of the invention, the 3G AP 215 is adapted to be an intermediary device for the provisioning information from the femto cell management system 240, using the TR-069 remote management protocol to the 3G AC 235. As the 3G AP 215 may be considered as an intermediary (untrusted) device, there may be an increased risk that information from the femto cell management system 240 to the 3G AC 235 may be intercepted and modified, prior to being received by the 3G AC 235. Thus, in one embodiment of the invention, it is envisaged that when the 3G AP 215 presents configuration information to the 3G AC 235, the configuration information must be authenticated. In this manner, information destined for the 3G AC 235 via the 3G AP 215 may be arranged to be 'signed' (e.g. with an authorized, validation field), whereby the signed information can be used to validate the information passed from the femto cell management system 240.

Thus, in one embodiment of the invention, it is envisaged that the signed information from the 3G AP 215 authenticated to the 3G AC 235 (or to a virtual private network (VPN) aggregator acting on behalf of the 3G AC), should be independently shown to be at least one or more from a group of:
  (i) from the Operational Support System (OSS),
  (ii) in tact (for example containing no additions, changes or deletions),
  (iii) forwarded from the identified 3G AP 215,
  (iv) identified for use with the target 3G AC 235, and
  (v) current (for example not replayed from a prior usage).

The VPN aggregator (or Security Gateway) may check the 3G AP identity/authorisation before allowing it through to the femto management system in the first place, and may pass on the authenticated identity of the 3G AP 215 to the femto management system, but the signed information from the femto management system is given via the 3G AP 215 to the 3G AC 235 for checking.

Furthermore, in one embodiment of the invention, the signed information routed via the 3G AP 215 may comprise one or more information elements from a group of:
  (i) a femto AP Serial Number
  (ii) a femto AP white list, which is a list of IMSIs of subscribers that are allowed access to the network via a particular femto AP.

In one embodiment of the invention, in order to provide authentication of the signed information from the 3G AP 215 to the 3G AC 235, it is envisaged that the femto cell management system 240 may generate a Provisioning Signature for each entry in the signed information by performing one or more from a group of:
  (i) Generating a Provisioning Signature by using one or concatenating two or more of: at least one Parameter Name and at least one Parameter Value; and
  (ii) Appending a signature timestamp. It is envisaged that this may be achieved by placing, say, a current time and date within the appended signature timestamp.

In one embodiment of the invention, it is also envisaged that the signature may be applied to all of the configuration information as a set. In an alternative embodiment, it is envisaged that the signature may be applied to any or all arbitrary subset(s) of the whole configuration information.

In accordance with embodiments of the invention, the 3G AP 215 is adapted to receive this signed information from the femto cell management system 240 and provision itself according to the received signed information. Once the 3G AP 215 has provisioned itself, it is arranged to communicate with the 3G AC 235.

In one embodiment of the invention, it is assumed that a portion of the configuration information received by the 3G AP 215 may be used in configuring the AP itself as well as also used to configure the 3G AC 235. In this embodiment, it is envisaged that any shared data should not be specified in duplicate. For example, in one embodiment of the invention, a portion of the signed information to be used by both the 3G AP 215 and the 3G AC 235 in their respective provisioning operations may comprise the International Mobile Subscriber Identity (IMSI) white list.

The communication with the 3G AC 235 is arranged to include a subset of the 3G AP 215 provisioning parameters, for example as identified by a signed parameter list, together with the aforementioned signed information intended for the 3G AC 235. In addition, it is envisaged that the signed information may comprise data that is only to be used by the 3G AC 235 in its provisioning operation.

In response to the transferred message, the 3G AC 235 has been adapted to validate the signature prior to updating the informed parameters on the 3G AC 235.

Thus, in one embodiment of the invention, it is envisaged that the 3G AP 215 may be provided with individual data items as part of its overall data model. In this embodiment the 3G AP 215 may be provided with a list of the data items needed by the 3G AC 235. Here, the 3G AP 215 may be provided with the responsibility for gathering those items, in order, and encoding the data items as needed for transport to the 3G AC 235, together with the signature. This embodiment minimizes any duplication of data on the 3G AP 215.

In an alternative embodiment of the invention, the 3G AP 215 may be provided with a single large portion of data that is pre-formed for transport to the 3G AC 235. Here, the 3G AP 215 may be configured to simply relay this single large portion to the 3G AC 235 without interpretation. This will duplicate any data needed by both the 3G AP 215 and the 3G AC 235.

Thus, in accordance with an embodiment of the invention, provisioning and the associated response(s) to the network are all being performed via interaction with a single entity, for example the 3G AC 235. Advantageously, a shared certificate is no longer required.

In one embodiment of the invention, it is envisaged that the data format used for signing should be unambiguous, and directly related to the configuration data model, so that when provisioning the 3G AC 235, the data signature can be easily validated by the 3G AC 235 against the presented data. In this regard, it is envisaged that the 3G AC 235 may validate the signature by validating a Certificate Chain, which may be considered as a chain of certificates from the femto management system's own certificate up to the root certificate used to create the femto management system's certificate. In this manner, the 3G AC 235 should be configured with a trust anchor that corresponds to one of the certificates in the Certificate Chain.

The 3G AC 235 is then arranged to concatenate attribute identifiers (IDs) and values of the attributes that appear in a Signed Attribute ID List, for example a list of attribute IDs that were used when generating the signature. In one embodiment of the invention, the Signed Attribute ID list may include one or more of the following items: a 3G AP Serial Number; an Access Control List.

The 3G AC 235 is then arranged to append a signature timestamp, for example by generating a signature over ID value pairs and appending the signature timestamp using a public key from the communicated Certificate Chain. In an alternative embodiment of the invention, it is envisaged that other mechanisms may be used to sign and check a signature, for example:

(i) a shared secret;
(ii) public/private key pairs associated with certificates within a PKI infrastructure;
(iii) a combination in which the public/private keys of (ii) are just used to encrypt a secret session key to allow it to be shared, and thence use this as a shared secret of (i).

Finally, the 3G AC 235 is arranged to compare the generated signature with the received configuration Signature, in order to identify whether it is the intended 3G AC 235 and whether the information has been tampered with.

This means the ordering and encoded representation of data from the configuration data model to the signing format must be well-defined. It is envisaged that the format used for communication between the 3G AP 215 and 3G AC 235 may be different than the signing format, so long as the original signing format can be faithfully reproduced.

Whilst the 3G AP 215 may be expected to provide the 3G AC 235 with configuration data each time it establishes communication with the 3G AC 235, doing so may add extra overhead to that process. Therefore, in one embodiment of the invention, it is envisaged that the 3G AC 235 may cache the most recent AP-specific configuration data for re-use in memory logic (not shown). Such a storage operation of recent AP-specific configuration data may create a problem with cache coherence, if the cached data becomes invalid, for example, due to a service change for the subscriber. If the entire configuration is not passed from the 3G AP 215 to the 3G AC 235 at each session establishment, then it is envisaged that a data item representing the unique identity of the configuration should be transferred instead.

The use of such a unique 'DataIdentifier' does allow a malicious 3G AP to continue to use cached, signed configuration data, even when its actual configuration has changed. Only the most recently used configuration data can be improperly reused in this way.

However, in accordance with an alternative embodiment of the invention, it is envisaged that a separate 'DataIdentifier' may be used to allow the cached configuration to be reused, despite the signature changing. This separate 'DataIdentifier' also adds initial variability into a computed 'hash' value, if it is placed at the beginning of the data fed to the 'hash' function.

The DataIdentifier value is used to allow the 3G AP 215 to indicate that its configuration has or has not changed, without presenting the entire configuration and signature to the 3G AC 235. When contacting the 3G AC 235, the 3G AP 215 may present just the 'DataIdentifier', which the 3G AC 235 may then validate against a 'DataIdentifier' value associated with the cached configuration.

If the supplied value of the 'DataIdentifier' matches the stored value on the 3G AC 235, the 3G AC 235 may then re-use the stored configuration. Thus, no configuration data or signature need be transmitted to the 3G AP 215, which will reduce load on the 3G AC 235. If not, then the 3G AC 235 may request the configuration data, as specified above.

If the 3G AC 235 has a valid, cached configuration for the 3G AP 215, the 3G AC 235 may request the 3G AP 215 to provide the current value of the 'DataIdentifier'.

The 'DataIdentifier' need not be particularly unpredictable, but should uniquely identify the configuration content. Hence, it is envisaged that the 'DataIdentifier' may be a sequential number or a good 'hash' value.

Additionally, any cached configuration for the 3G AP 215 held by the 3G AC 235 should eventually be allowed to expire, or be explicitly removed from the 3G AC 235 by the OSS.

In accordance with one embodiment of the invention, the signature value itself is configured to serve the purpose of a unique data identifier.

However, in accordance with an alternative embodiment of the invention, it is envisaged that the 3G AP 215 may suffer from power loss or be reset and thereby lose its configuration information more frequently than the 3G AC-oriented portion of the configuration information. In this alternative embodiment, it is envisaged that the 3G AP 215 may be configured to re-sign the configuration data with a new timestamp at each reset. In this manner, the signature may change even though the configuration does not.

When the 3G AP 215 supplies configuration data to the 3G AC 235, the 3G AC 235 should check the signature timestamp and validity time. If the signature validity time has expired, the 3G AC 235 should reject the 3G AP 215, for example giving a reason of an 'expired signature'. In this manner, the 3G AP 215 must obtain a fresh signature from the femto management system 240.

If the signature has not expired, the 3G AC 235 must independently compute the data signature as specified above, and validate it against the supplied signature value. If the signature does not validate, the 3G AC 235 must reject the 3G AP 215, for example providing a reason of an 'invalid signature'. In this manner, the 3G AP 215 must obtain fresh configuration data from the femto management system 240.

Thus, the 3G AP 215 may be rejected by the 3G AC 235 due to:

(i) A bad Signature;
(ii) An unknown Key; or
(iii) An expired Signature.

The latter two, at least, are not unexpected in cases where the 3G AP 215 becomes disconnected from the network due to network failures, and some time has passed since obtaining a signature in its configuration.

In one embodiment of the invention, it is envisaged that the 'DataValidity' time value may be used to time out cached configuration settings, in the case that a 3G AP 215 has been relocated to a different 3G AC. The aging commences when the 3G AC 235 loses connection with the 3G AP 215, so as long as the 3G AP 215 occasionally connects, this value will never cause the configuration data to be removed. The 3G AC 235 will cache at most one set of configuration data for each 3G AP 215.

In one embodiment of the invention, 'SigValidity' and 'SigTimestamp' fields are provided to prevent selective replays of prior configuration without having it re-confirmed by femto management system 240. The use of this mechanism requires the 3G AP 215 to be provided with a fresh signature when one is needed, which may be often if the 3G AC 235 is not caching configurations and the network between the 3G AC 235 and the 3G AP 215 is unreliable. If the 3G AC 235 caches AP-specific configuration, and uses the 'DataIdentifier' to allow re-use, then the signature validity will not negatively affect re-connection due to network loss.

When the 3G AP 215 contacts the 3G AC 235 and tries to associate, the 3G AP 215 identifies and authenticates itself. If the 3G AC 235 has no configuration for the 3G AP 215 (either it never had any, or the 'DataValidity' time has expired), the 3G AC 235 requests configuration data from the 3G AP 215, which the 3G AP 215 provides, either in the signing format directly, or in an alternate format from which the signing format can be derived.

Scenario 1:

If the 3G AC 235 does not have a 3G AP 215 Connection Object with the Serial Number received in the SOIP Identity procedure then the 3G AC 235 validates the received data by:

(i) Ensuring that the received Signature Timestamp has not expired.

(ii) Ensuring that the received Configuration Signature and the Signed Attribute ID List are consistent with the attributes received from the 3G AP 215.

(iii) Ensuring that all of the configuration information of the 3G AP 215 is valid.

If the 3G AC 235 is satisfied with the configuration then the 3G AC 235 creates a 3G AP Connection Object and a 3G AP Object.

Alternatively, if the 3G AC 235 is not satisfied with any aspect of the configuration, the 3G AC 235 closes the SOIP connection, passing a 'cause' code back to the 3G AP 215.

Scenario 2:

If the 3G AC 235 does have a 3G AP Connection Object with the Serial Number received in the SOIP Identity, but the Allowed Configuration Signature is different from the Configuration Signature received from the 3G AP 215 then the 3G AC 235 validates the received data by:

(i) Ensuring that the received Signature Timestamp has not expired.

(ii) Ensuring that the received Configuration Signature and the Signed Attribute ID List are consistent with the attributes received from the 3G AP 215.

(iii) Ensuring that all of the 3G AP configuration is valid.

If the 3G AC 235 is satisfied with the configuration then the 3G AC 235 updates the Allowed Configuration Signature in the 3G AP Connection Object and updates the 3G AP 215 object based on the configuration received from the 3G AP. The 3G AC issues AVCNs for any attributes that have changed. If the 3G AC is not happy with any aspect of the configuration, the 3G AC keeps its stored 3G AP Connection and 3G AP Object and closes the SOIP connection, passing a cause code back to the 3G AP.

Scenario 3:

If the 3G AC 235 does have a 3G AP Connection Object with the Serial Number received in the SOIP Identity, and the Allowed Configuration Signature is the same as the received Configuration Signature then the 3G validation includes ensuring that the received Configuration Signature and the Signed Attribute ID List are consistent with the attributes received from the 3G AP.

If the 3G AC has a stored 3G AP Object, then the previous validation step may be simplified by ensuring that the Signed Attribute ID list and all attributes in the Signed Attribute ID List are identical between the stored configuration and the received configuration.

In one embodiment of the invention, it is noteworthy that in this case the 3G AC shall not check the Signature Timestamp as this only needs to be validated when the signature is initially presented to the 3G AC; once a Configuration Signature has been accepted by the 3G AC, the 3G AC will continue to accept it as long as the signed configuration does not change.

If the 3G AC 235 is satisfied with the configuration then the 3G AC 235 updates the 3G AP Object based on the information received from the 3G AP 215 and issues any appropriate AVCNs. If the 3G AC 235 is not happy with any aspect of the configuration, the 3G AC 235 keeps its stored 3G AP Connection and 3G AP Object and closes the SOIP connection, passing a cause code back to the 3G AP 215.

If the 3G AC 235 connection to one or more of the CN domains is unavailable, then the 3G AC may (based on the 3G AC MIB attribute CN Availability policy) initiate the BSMIS Set Attributes procedure to set the Cell Barred by AC attribute.

Once the 3G AC is prepared to provide service to this 3G AP, the 3G AC sends a Service Enable action instructing the 3G AP to provide service.

On receiving the Service Enable action, the 3G AP 215 opens the SOIP URSL Stream to the 3G AC 235. Once this stream is open, the 3G AP turns on its radio and goes operational. The 3G AP 215 then issues an AVCN for operational state.

In an ideal scenario, once the 3G femto cell AP has selected its provisioning values, it is useful for the 3G femto cell AP to report to some management entity within the network the precise values that it has chosen, in order for the network to know, record and respond to (if appropriate) the final values chosen.

Currently, it is envisaged that all such 3G femto cell AP provisioning values will be sent over the public internet. Hence, there is a need to both validate and authenticate which 3G femto cell AP the values came from and that they are based on an approved set of initial provisioning parameters, such as those supplied by a trusted source. Validation and authentication of these provisioning values is required in order to avoid network attack via extraction and manipulation of these values.

Figure 3:
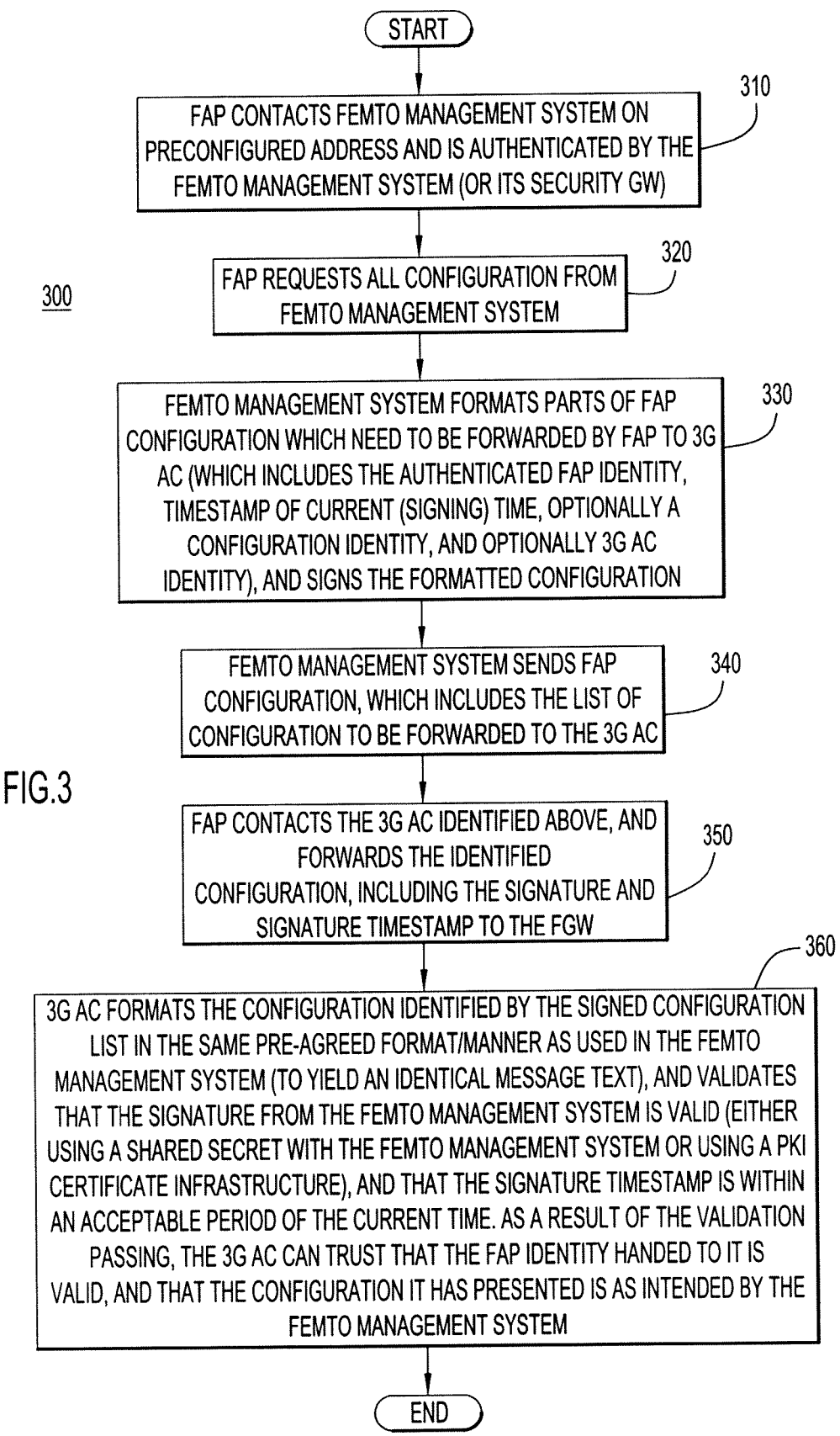
FIG. 3 illustrates an example of a flowchart of a process at a 3G AP start-up having no configuration information, with the 3G AP known to a femto management system and unknown to the 3G AC, according to some embodiments of the invention.

Referring now to FIG. 3, an example of a flowchart of a process at a 3G AP start-up is illustrated according to some embodiments of the invention, where the 3G AP has no configuration information, with the 3G AP known to a femto management system and unknown to the 3G AC. First, a 3G AP contacts a femto management system on a pre-configured address and is authenticated by the femto management system (or its security gateway (GW)), as shown in step 310. The 3G AP requests all configuration from Femto Management System, as shown in step 320. The Femto Management System formats parts of the 3G AP configuration, which is to be forwarded by the 3G AP to a 3G AC (which includes the authenticated 3G AP identity, timestamp of current (signing) time, optionally a configuration identity, and optionally 3G AC identity), and signs the formatted configuration, as shown in step 330. Notably, prior art mechanisms do not use this form of signing; nor is the timestamping of the configuration signing time known.

The Femto Management System sends 3G AP configuration information, which includes the list of configuration to be forwarded to the 3G AC, as shown in step 340. Thereafter, the 3G AP contacts the 3G AC as identified above, and forwards the identified configuration. The forwarded configuration information includes the signature and signature timestamp to the 3G AC, as shown in step 350. The 3G AC formats the configuration information identified by the signed configuration list in the same pre-agreed format/manner as used in the Femto Management System (to yield an identical message text), and validates that the signature from the Femto Management System is valid (either using a shared secret with the Femto Management System or using a PKI Certificate infrastructure), and that the signature timestamp is within an acceptable period of the current time. As a result of the validation passing, the 3G AC is able to trust that the 3G AP identity handed to it is valid, and that the configuration it has presented is as intended by the Femto Management System, as shown in step 350. As mentioned, the validation of signature and its timestamp is not employed in known mechanisms.

Figure 4:
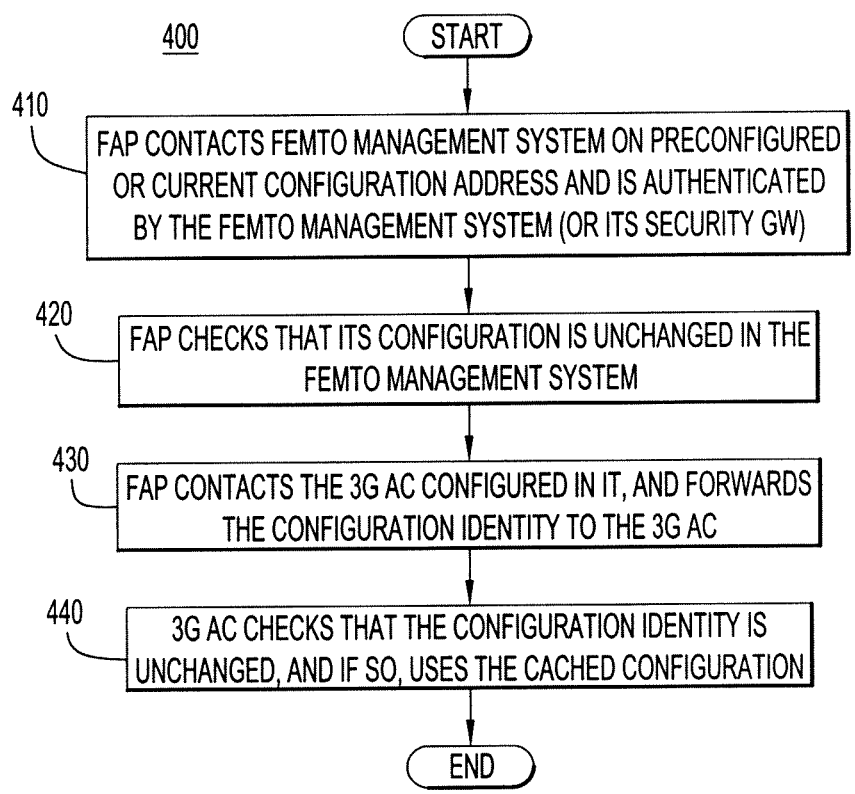
FIG. 4 illustrates an example of a flowchart of a process at a 3G AP start-up having no configuration information, with the 3G AP known to a femto management system and known to the 3G AC, which has retained its configuration information that has not changed, according to some embodiments of the invention.

Referring now to FIG. 4 an example of a flowchart of a process 400 at a 3G AP start-up is illustrated according to some embodiments of the invention. The 3G AP has no configuration information, with the 3G AP known to a femto management system and known to the 3G AC, which has retained its configuration information that has not changed. A 3G AP contacts a Femto Management System on a preconfigured or current configuration address and is authenticated by the Femto Management System (or its security GW), as shown in step 410. The 3G AP checks that its configuration is unchanged in the Femto Management System, as shown in step 420. The 3G AP contacts the 3G AC configured in it, and forwards the configuration identity to the 3G AC as shown in step 430. Thereafter, the 3G AC checks that the configuration identity is unchanged, and if so, uses the cached configuration, as shown in step 440.

Figure 5:
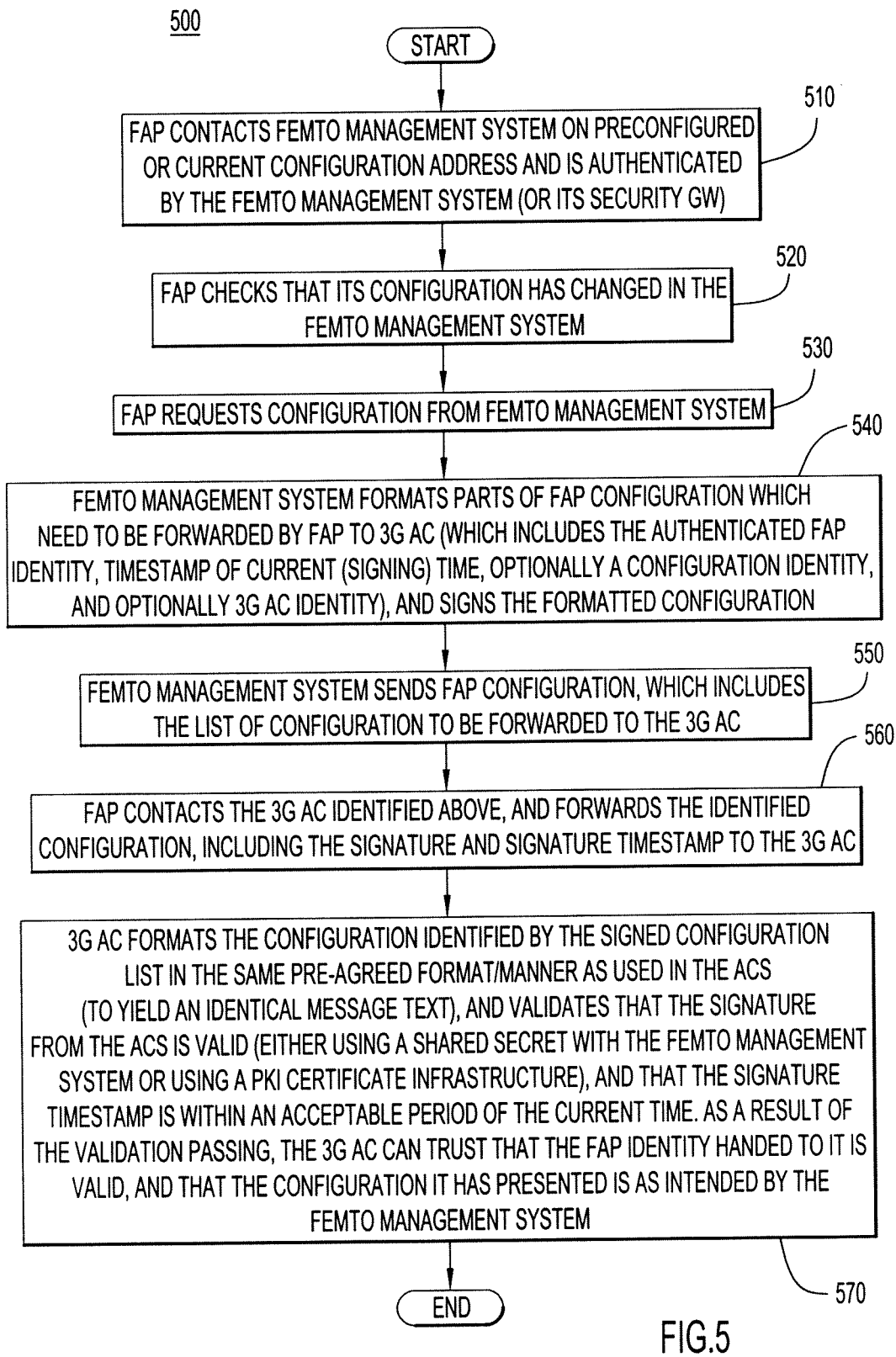
FIG. 5 illustrates an example of a flowchart of a process for at a 3G AP start-up having configuration information, with the 3G AP known to a femto management system and known to the 3G AC, which has retained its configuration information and the configuration information has changed, according to some embodiments of the invention.

Referring now to FIG. 5 an example of a flowchart of a process for at a 3G AP start-up is illustrated according to some embodiments of the invention. The 3G AP has configuration information, with the 3G AP known to a femto management system and known to the 3G AC, which has retained its configuration information and the configuration information has changed. A 3G AP contacts Femto Management System on a preconfigured or current configuration address and is authenticated by the Femto Management System (or its security GW), as shown in step 510. The 3G AP checks that its configuration has changed in the Femto Management System as shown in step 520. Thereafter, the 3G AP requests configuration from Femto Management System, as shown in step 530. The Femto Management System formats parts of the 3G AP configuration information, which is to be forwarded by the 3G AP to the 3G AC (which includes the authenticated 3G AP identity, timestamp of current (signing) time, optionally a configuration identity, and optionally 3G AC identity), and signs the formatted configuration, as shown in step 540. Again, prior art mechanisms do not employ this form of signing, or the timestamping of the configuration signing time. The Femto Management System sends the 3G AP configuration information, which includes the list of configuration to be forwarded to the 3G AC as shown in step 550. The 3G AP contacts the 3G AC identified above, and forwards the identified configuration, including the signature and signature timestamp to the 3G AC as shown in step 560. The 3G AC formats the configuration identified by the signed configuration list in the same pre-agreed format/manner as used in the Femto Management System (to yield an identical message text), and determines whether the signature from the Femto Management System is valid (either using a shared secret with the Femto Management System or using a public key infrastructure (PKI) Certificate infrastructure), and that the signature timestamp is within an acceptable period of the current time. As a result of the validation passing, the 3G AC can trust that the 3G AP identity handed to it is valid, and that the configuration it has presented is as intended by the Femto Management System, as shown in step 570. Again, it is notable that the validation of a signature and its timestamp is not employed in known mechanisms.

A skilled artisan will appreciate that a number of the aforementioned steps in FIG. 3, FIG. 4 and/or FIG. 5 may be deemed optional.

Figure 6:
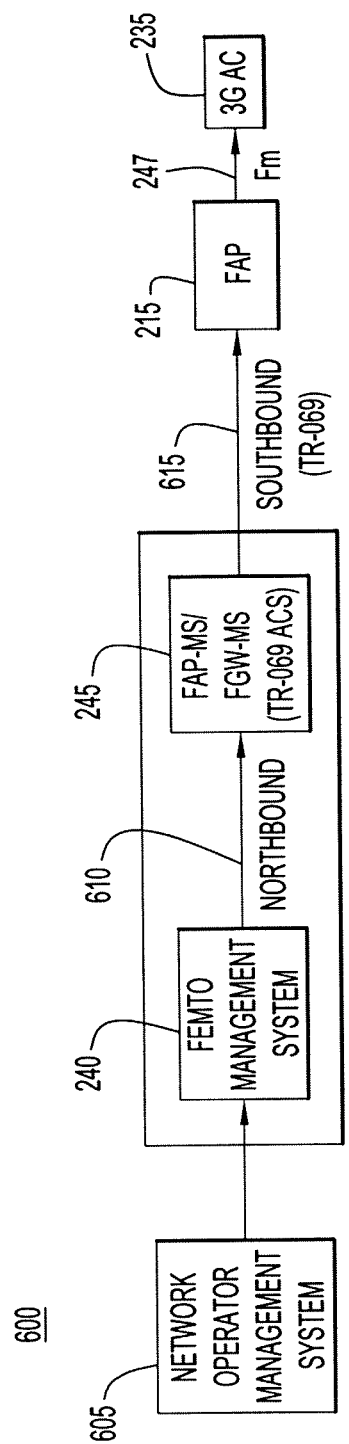
FIG. 6 illustrates a further example of part of a cellular communication network architecture adapted in accordance with some embodiments of the invention.

Referring now to FIG. 6, a further example of part of a cellular communication network architecture 600, adapted in accordance with some embodiments of the invention is illustrated. The cellular communication network architecture 600 comprises a Network Operator Management System 605, which is operably coupled to a femto management system 240, in turn operably coupled to femto AP and femto AC (or a femto GW) logic modules 245. The femto AP and femto AC (or a femto GW) logic modules 245 are operably coupled to a femto AP 215, which is operably coupled to a femto AC 235 via an Fm interface 247.

Figure 7:
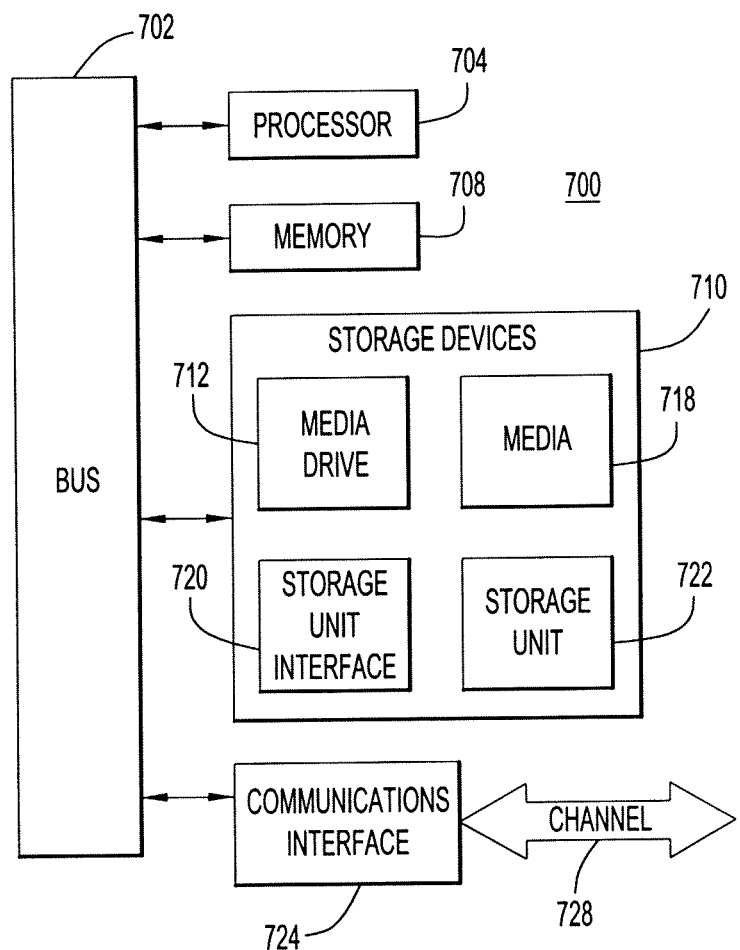
FIG. 7 illustrates a typical computing system that may be employed to implement signal processing functionality in embodiments of the invention.

Referring now to FIG. 7, there is illustrated a typical computing system 700 that may be employed to implement signal processing functionality in embodiments of the invention. Computing systems of this type may be used in access points and wireless communication units and in an access controller. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special-purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having particular computer software or data stored therein. In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 722, drive 712 or communications interface 724. The control logic (in this example, software instructions or computer program code), when executed by the processor 704, causes the processor 704 to perform the functions of the invention as described herein. It will be appreciated that, for clarity purposes, the above description has described embodiments of the invention with reference to different functional elements and processors. However, it will be apparent that any suitable distribution of functionality between different functional elements or processors, for example with respect to the access point or controller, may be used without detracting from the invention. For example, it is envisaged that functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although one embodiment of the invention describes an access point for a UMTS network, it is envisaged that the inventive concept is not restricted to this embodiment.

It is envisaged that the aforementioned inventive concept aims to provide at least one or more of the following advantages:

(i) One provisioning Interface, which removes Femto/3G AP and 3G AC data misalignment;

(ii) The 3G femto cell AP acts as an Intelligent Residential Gateway and provisions the 3G AC with the 3G femto cell AP required information for service, which is similar to DSL Provisioning Architectures for upstream systems via the CPE (iii) Reduced capital expenditure and operating costs due to the reduced number of Femtocell Management applications and interfaces required to be defined, developed, integrated, and supported.

(iv) Direct provisioning of APs is better for scalability, as there is only one entity to provision, thereby resulting in a reduced operational expenditure as well reduces the size of the management system, and hence capital expenditure.

(v) Not having to provision ACs alongside APs is better for both scalability and data synchronization.

(vi) Enabling more efficient use of resources when implementing provision of information on a cellular basis.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Moreover, an embodiment can be implemented as a computer-readable storage element or other tangible media having computer readable code or logic stored thereon for programming a computer (e.g., comprising a signal processing device) to perform or execute a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation. The logic may be embodied in an integrated circuit as well.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

Thus, a method and apparatus for provisioning of information in a cellular communication network have been described, which substantially addresses at least some of the shortcomings of past and present access control techniques and/or mechanisms.

What is claimed is:

1. A system comprising:
an access point configured to facilitate communication from a wireless subscriber communication unit to a cellular communication network, the access point comprising access point configuration logic arranged to configure the access point with access point configuration information, wherein the access point is a femto-cell wireless access point device;
an access controller configured to control access to the cellular communication network, wherein the access controller is operably coupled to the access point, wherein the access controller comprises access controller configuration logic arranged to receive access controller configuration information from the access point and to configure the access controller with the access controller configuration information;
wherein the access point configuration logic is arranged to configure the access point with access point configuration information comprising, at least in part, the access controller configuration information received by the access point intended for the access controller for configuration of the access controller to provision the access controller to exchange communications with the access point.

2. The system of claim 1, and further comprising a network management unit that is configured to generate a provisioning signature for at least a portion of the access controller configuration information to form signed information, and wherein the access controller logic is configured to determine whether the access controller configuration information has been modified based on received signed information received from the access point.

3. The system of claim 2, wherein the network management unit is configured to authenticate with the access controller by routing the signed information via the access point.

4. The system of claim 2, wherein the network management unit is configured to generate the signed information comprising one or more information elements from a group of:
(i) an access point serial number;
(ii) an access point list of subscriber unit identifiers that are allowed access to a communication network via the access point.

5. The system of claim 4, wherein the network management unit is configured to generate the provisioning signature for substantially each entry in the access point list by performing at least one from a group of:
(i) using one of at least one parameter name and at least one parameter value;
(ii) concatenating two or more of: at least one parameter name and at least one parameter value;
(iii) appending a signature timestamp.

6. The system of claim 2, wherein the network management unit is configured to apply the provisioning signature to at least one from a group of:
(i) all of the configuration information as a set;
(ii) a subset of the whole configuration information.

7. The system of claim 2, wherein network management unit is configured to generate at least a portion of the configuration information that is arranged to be used in configuring the access point as well as configuring the access controller.

8. The system of claim 2, wherein the network management unit is arranged to generate a new provisioning signature associated with the access controller configuration information together with a new timestamp at each reset of the access point.

9. The system of claim 2, wherein the access controller is configured to reject the configuration information provided by the access point upon at least one from a group of:
(i) receipt of an incorrect provisioning signature;
(ii) receipt of an unknown key identifier;
(iii) an expired provisioning signature.

10. The system of claim 2, wherein the access controller is arranged to validate the provisioning signature prior to updating at least one configuration parameter of the access controller.

11. The system of claim 1, wherein the access point configuration information comprises one or more from the group of:
(i) a subset of the access controller configuration information;
(ii) substantially all of the access controller configuration information as provided to the access controller.

12. The system of claim 1, wherein the access point is configured to forward the access controller configuration information to the access controller during connection setup of the access point.

13. The system of claim 1, wherein the access controller comprises memory arranged to store previous access controller configuration information and comparison logic arranged to determine whether a change in the configuration information has occurred based on a comparison of the previously stored configuration information with received configuration information from the access point.

14. Logic encoded in one or more non-transitory tangible media for execution and when executed operable to:
receive at an access point operating as a femto-cell wireless access point device associated with a cellular communication network, configuration information intended for an access controller that controls access to the cellular communication network for configuration of the access controller; and
configure the access point with configuration information comprising, at least in part, the configuration information received by the access point intended for configuration of the access controller to provision the access controller to exchange communications with the access point.

15. An integrated circuit comprising the logic of claim 14.

16. Logic encoded in one or more non-transitory tangible media for execution and when executed operable to:
receive access controller configuration information from a network management unit via an access point operating as a femto-cell wireless access point device, wherein the access controller configuration information comprises a provisioning signature for at least a portion of the access controller configuration information to create signed information such that the access controller can ultimately use the configuration information for access controller configuration;
configure the access controller with the received access controller configuration information comprising the signed information to provision the access controller to exchange communications with the access point; and
determine whether the access controller configuration information has been modified by the access point based on the received signed information.

17. The logic of claim 16, wherein the logic that determines is configured to analyze the signed information to determine whether the access controller information has been modified, wherein the signed information comprises one or more information elements from a group of:
  (i) an access point serial number;
  (ii) an access point list of subscriber unit identifiers that are allowed access to a communication network via the access point.

18. The logic of claim 16, and further comprising logic arranged to reject the configuration information provided by the access point in response to at least one from a group of:
  (i) receipt of an incorrect provisioning signature;
  (ii) receipt of an unknown Key identifier;
  (iii) an expired provisioning signature.

19. An integrated circuit comprising the logic of claim 16.

20. A method comprising:
  at an access point associated with a cellular communication network and operating as a femto-cell wireless access point device, receiving configuration information intended for an access controller to which the access point is operably coupled and that is ultimately used by the access controller for configuration of the access controller; and
  configuring the access point with configuration information comprising, at least in part, the configuration information received by the access point intended for configuration of the access controller to provision the access controller to exchange communications with the access point.

21. A method comprising:
  receiving at an access controller that controls access to a cellular communication network, access controller configuration information from a network management unit via an access point operating as a femto-cell wireless access point device, wherein the access controller configuration information comprises a provisioning signature for at least a portion of the access controller configuration information to create signed information such that the access controller can ultimately use the configuration information for access controller configuration;
  configuring the access controller with the received access controller configuration information comprising the signed information to provision the access controller to exchange communications with the access point; and
  determining whether the access controller configuration information has been modified based on the received signed information.

22. A non-transitory computer-readable storage element having computer-readable code stored thereon for programming signal processing logic to perform a method for configuring an access point operably coupled to an access controller, wherein the code is operable for at an access point to:
  receive configuration information intended for an access controller that is ultimately used by the access controller for configuration of the access controller, wherein the computer-readable storage element is characterized by code operable to:
  configure the access point operating as a femto-cell wireless access point device with configuration information comprising, at least in part, the configuration information received by the access point intended for the access controller for configuration of the access controller to provision the access controller to exchange communications with the access point.

23. A non-transitory computer-readable storage element having computer-readable code stored thereon for programming signal processing logic to perform a method for facilitating communication from a wireless subscriber communication unit to a cellular communication network via an access point operably coupled to an access controller, wherein the code is operable for at an access controller to:
  receive access controller configuration information from a network management system via the access point operating as a femto-cell wireless access point device, wherein the access controller configuration information comprises a provisioning signature for at least a portion of the access controller configuration information to create signed information such that the access controller can ultimately use the configuration information for configuration of the access controller;
  configure the access controller with the received access controller configuration information comprising the signed information to provision the access controller to exchange communications with the access point; and
  determining whether the access controller configuration information has been modified by the access point based on the received signed information.

24. The computer-readable storage element of claim 23, wherein the computer readable storage element comprises at least one of: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

* * * * *